United States Patent [19]

Hill

[11] 4,383,479
[45] May 17, 1983

[54] COCONUT HUSK REMOVING TOOL

[76] Inventor: Edward D. Hill, 11212 Edgewater Dr., Cleveland, Ohio 44102

[21] Appl. No.: 297,428

[22] Filed: Aug. 28, 1981

[51] Int. Cl.³ .......................... A23N 5/03; A23N 5/08
[52] U.S. Cl. .................................... 99/572; 30/120.1; 99/574; 99/582; 99/583; 99/591
[58] Field of Search ................... 99/514, 515, 537–541, 99/547, 557, 567, 568, 571–575, 579–583, 584, 588, 590–593, 646 R; 30/120.1, 120.5; 83/570; 7/129, 110, 113; D7/98, 105, 106

[56] References Cited
U.S. PATENT DOCUMENTS 983,631  2/1911  Marot .................................... 99/591

Primary Examiner—Philip R. Coe
Assistant Examiner—Timothy F. Simone
Attorney, Agent, or Firm—Wilson, Fraser, Barker & Clemens

[57] ABSTRACT

A device for forcefully removing husks from coconuts provided with a pair of hingedly connected wedge blades adapted to be inserted into the coconut husk. One blade is stationary and the other blade has a handle to enable it to be rocked for prying the husk away from the seed. Two or more operations are required for removing the entire husk. The so-called stationary blade is fixed to a vertically movable cross bar, the ends of which slide on spaced rods forming part of a frame. The frame is intended to be mounted upright on a support, such as a post.

10 Claims, 3 Drawing Figures

COCONUT HUSK REMOVING TOOL

BACKGROUND AND SUMMARY OF THE INVENTION

The husking of coconuts is a laborious, time-consuming and somewhat risky undertaking. No set formula seems to exist for handling this operation, but usually it is carried out with a hatchet, knife, or machete. To a novice, these can be dangerous especially in dealing with a coconut due to its being ungainly. Additionally, it required considerable time to do the job, so that it has not been a profitable operation.

This invention provides a relatively simple tool for husking coconuts and one which does not pose risks and can be achieved easily quickly and without the necessity of prior training. The tool includes wedge blades which are forced into the husk and then one of the blades is shifted away from the other, thereby to tear loose a portion of the fibrous husk. This is repeated until the entire husk is forced from the seed. The entire operation can be accomplished quickly and easily.

DESCRIPTION OF PREFERRED EMBODIMENT

Figure 3:
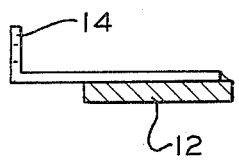
FIG. 3 is a sectional view on the line 3—3 of FIG. 1.

The illustrated embodiment of the invention comprises an upright frame having a transverse metal base rail 10 and an upwardly spaced top metal rail 12. On each of the rails 10 and 12 is a centrally disposed apertured angle iron bracket 14, which is shown in FIG. 3 spaces the frame laterally to afford working clearance. Suitable fasteners connect these brackets to a post (not shown) at a convenient height. A pair of laterally spaced welded on cylindrical metal upright guide rods 16 and 18, respectively, connect the rails 10 and 12, thereby forming a rigid frame. Between the guide rods is a transverse metal tool-carrying bar 20 to the ends of which are secured vertical tubular guide 22, which slidingly engage the guide rods 16 and 18 respectively, thereby enabling the bar 20 to be manually raised or lowered, as desired.

A coconut husk removing tool is secured to the central portion of the cross bar 20 and comprises a pair of metal plates, or blades 24 and 26 constituting wedge members. The plates or blades 24 and 26 are of substantial width and thickness and the normal position flatwise abut against each other. The lower end of each blade is champfered downwardly and inwardly to form oppositely included wedge surfaces 28 and 30 on the blades 24 and 26, respectively. The bottom bevel edge of each blade is sharp and the edge portion of blade 24 is slightly longer than that of the blade 26. The upper edge portion of the blade 24 is welded to the front face of the cross bar 20 so that the blade 24 is retained stationary while the blade 26 can pivot or rock relative to the blade 24. For this purpose the upper ends of the plates or blades are connected by a suitable hinge 32. Near the upper end of the outer side of the plate 26 and opposite the cross bar 20 is rigidly fixed a screw socket 34 to receive the threaded end portion of a pipe 36 providing the operating handle for moving the wedge blade 26 upwardly and outwardly as shown by the broken lines on FIG. 2. A suitable grip 38 is on the outer end of the handle. A wooden bowl 40 rests on the base rail 10 to receive the coconut to be stripped.

Figure 1:
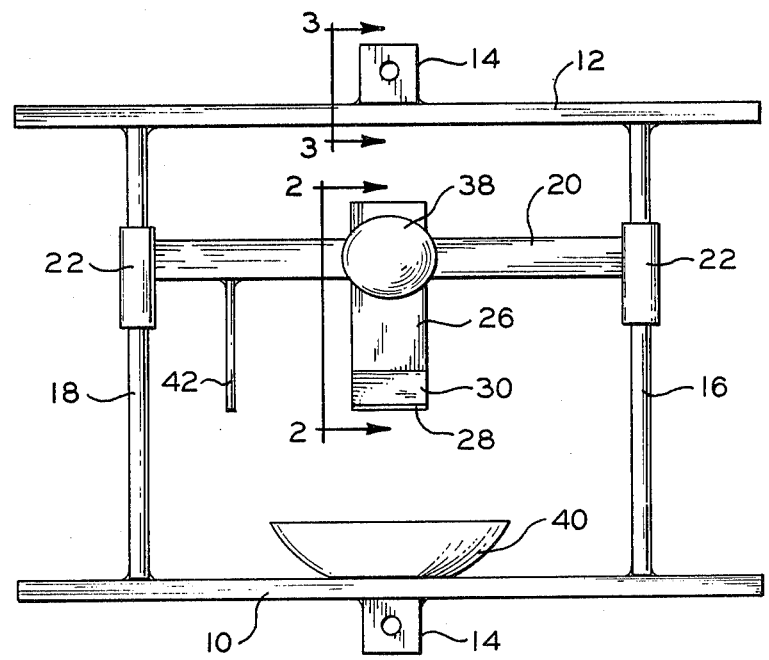
FIG. 1 is a front elevational of a frame provided with a vertical reciprocatory slide carrying a tool for removing the husk from a coconut.
Figure 2:
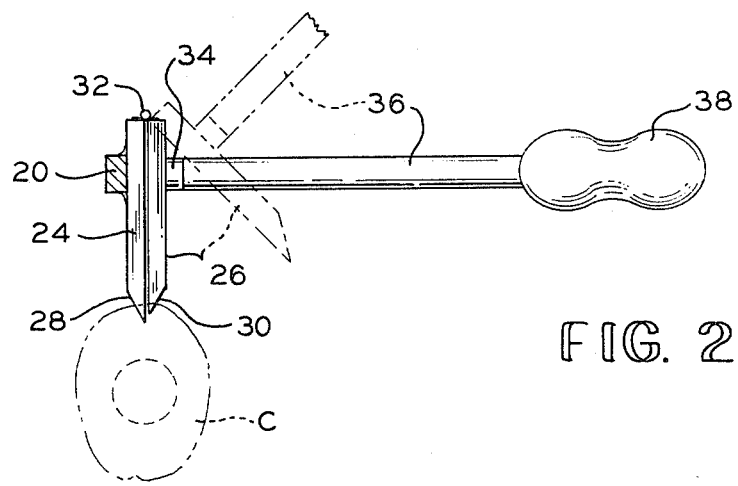
FIG. 2 is a sectional view on the line 2—2 of FIG. 1 showing the husk removing tool and an associated coconut in broken lines.

In operation, a coconut to be husked is placed in the bowl 40 in the proper position and then the cross bar 20 is manually lowered to forcefully cause the pointed ends of the husking blades 24 and 26 to enter the coconut husk, as indicated on FIG. 2. Then by grasping the handle grip 38, the handle is lifted thereby causing the blade 26 to divide the husk and one half is torn loose. The blade 24 is held stationary and retains the coconut in position. Thereafter the coconut is turned sidewise and that part is halved, leaving a narrow section that the blades can easily remove from the coconut.

Carried by and depending from the cross bar 20 is a punch 42 which upon forcefully lowering the cross bar can pierce the eye of the coconut for removing the husk.

Changes in details of construction, operation and choice of materials may be made without departing from the invention.

What is claimed is:

1. A device for removing the husk from a coconut comprising a pair of blades arranged flatwise against each other, means for forcing said blades into the coconut husk, a hinged connection between end portions of said blades, means to hold one blade stationary, and means for pivoting the other blade away from the one blade about said hinged connection thereby to tear away a portion of the husk.

2. A coconut husk removing device as claimed in claim 1 comprising wedge means on the blades for entering the husk.

3. A coconut husk removing device as claimed in claim 1 wherein said means for pivoting includes a handle connected to said other blade.

4. A coconut husk removing device as claimed in claim 3 comprising downwardly and inwardly inclined lower end portions of said blades which when in abutting relation provide a pointed end to be forced into the husked end of a coconut.

5. A coconut husk removing device as claimed in claim 4 comprising a detachable connection between said handle and the respective blade adjacent said hinge connection.

6. A coconut husk removing device as claimed in claim 1 comprising a cross bar to which one blade is fixed to hold same stationary during husk removing, a pair of spaced upright rods, and sliding connections between end portions of said cross bar and said rods.

7. A coconut husk removing device as claimed in claim 6, comprising a pair of vertically spaced bars to which end portions of said rods are fixed respectively, and mounting brackets on said bars for spacing same from a support to afford working clearance.

8. A coconut husk removing device as claimed in claim 7, comprising receptacle means on the lower of said vertically spaced bars to receive a coconut to be husked.

9. A coconut husk removing device as claimed in claim 8, comprising a punch on said cross bar for use in piercing the eye of a coconut for removing the milk.

10. A coconut husk removing device comprising:
 a—a pair of vertically disposed blades disposed flatwise against each other, b—pointed wedge means at the lower ends of said blades to be forced into the husk,
c—a hinge connection between the upper ends of said blades,
d—a laterally projecting handle connected to the upper end portion of one blade adjacent said hinge connection,
e—a cross bar to which the upper end portion of the other blade is fixed,
f—a frame having vertically spaced, horizontal bars to which laterally spaced vertical rods are secured at their ends,
g—a slidable connection between each end of said cross bar and said vertical rods to enable the cross bar to be moved up or down,
h—means on the lower of said horizontal bars to hold a coconut to be husked,
i—and means for connecting said frame to an upright support.

* * * * *